United States Patent
Hochman et al.

(10) Patent No.: US 12,501,170 B2
(45) Date of Patent: *Dec. 16, 2025

(54) ELIMINATION OF ARTIFACTS IN CAPTURED IMAGES OF LED TILE DISPLAYS

(71) Applicant: H2VR HoldCo, Inc., Walnut, CA (US)

(72) Inventors: Jeremy Hochman, Walnut, CA (US); Christopher S. Byrne, Napier (NZ)

(73) Assignee: H2VR HoldCo, Inc., Valencia, CA (US)

( * ) Notice: Subject to any disclaimer, the term of this patent is extended or adjusted under 35 U.S.C. 154(b) by 274 days.

This patent is subject to a terminal disclaimer.

(21) Appl. No.: 18/112,205

(22) Filed: Feb. 21, 2023

(65) Prior Publication Data

US 2023/0209207 A1 Jun. 29, 2023

Related U.S. Application Data

(63) Continuation of application No. PCT/US2021/046484, filed on Aug. 18, 2021, which is a continuation of application No. 17/320,135, filed on May 13, 2021, now Pat. No. 11,310,436.

(60) Provisional application No. 62/706,500, filed on Aug. 20, 2020.

(51) Int. Cl.
*H04N 23/73* (2023.01)
*H04N 5/06* (2006.01)
*H04N 5/222* (2006.01)

(52) U.S. Cl.
CPC ............... *H04N 23/73* (2023.01); *H04N 5/06* (2013.01); *H04N 5/2228* (2013.01)

(58) Field of Classification Search
CPC ......... H04N 23/73; H04N 5/06; H04N 5/2228
See application file for complete search history.

(56) References Cited

U.S. PATENT DOCUMENTS

| | | | |
|---|---|---|---|
| 9,743,010 B1 | 8/2017 | Edwards | |
| 9,930,303 B1 | 3/2018 | Morgan et al. | |
| 11,130,436 B2 * | 9/2021 | Ayoub | B60R 9/06 |
| 2017/0237887 A1 | 8/2017 | Tanaka et al. | |

(Continued)

FOREIGN PATENT DOCUMENTS

| | | |
|---|---|---|
| JP | 2015133251 A | 7/2015 |
| JP | 2017021968 A | 1/2017 |
| WO | 2016148979 A1 | 9/2016 |

(Continued)

OTHER PUBLICATIONS

International Search Report and Written Opinion dated Sep. 15, 2021, in connection with PCT/US2021/046484 filed Aug. 18, 2021.

(Continued)

*Primary Examiner* — Lin Ye
*Assistant Examiner* — Fayez A Bhuiyan
(74) *Attorney, Agent, or Firm* — Downs Rachlin Martin PLLC

(57) ABSTRACT

Systems and methods for moving image capture from video displays are disclosed. In particular, systems and methods for synchronizing display and camera timing so as to reduce or eliminate artifacts appearing in the captured moving images due to unsynchronized interaction between camera shutter/exposure timing and the timing of the display control signal.

26 Claims, 9 Drawing Sheets

(56) References Cited

U.S. PATENT DOCUMENTS

2020/0005699 A1   1/2020  Yi et al.

FOREIGN PATENT DOCUMENTS

| WO | 2018138366 A1 | 8/2018 |
| WO | 2018138367 A1 | 8/2018 |
| WO | 2020021067 A1 | 1/2020 |
| WO | 2020021068 A1 | 1/2020 |
| WO | 2020053416 A1 | 3/2020 |
| WO | 2021081512 A1 | 4/2021 |
| WO | 2021160703 A1 | 8/2021 |
| WO | 2022/33799 A1 | 2/2022 |
| WO | 2022112579 A2 | 6/2022 |

OTHER PUBLICATIONS

Alexa Studio Electronic and Mirror Shutter, White Paper, Jan. 19, 2021, ARRI; pp. 1-9.

* cited by examiner

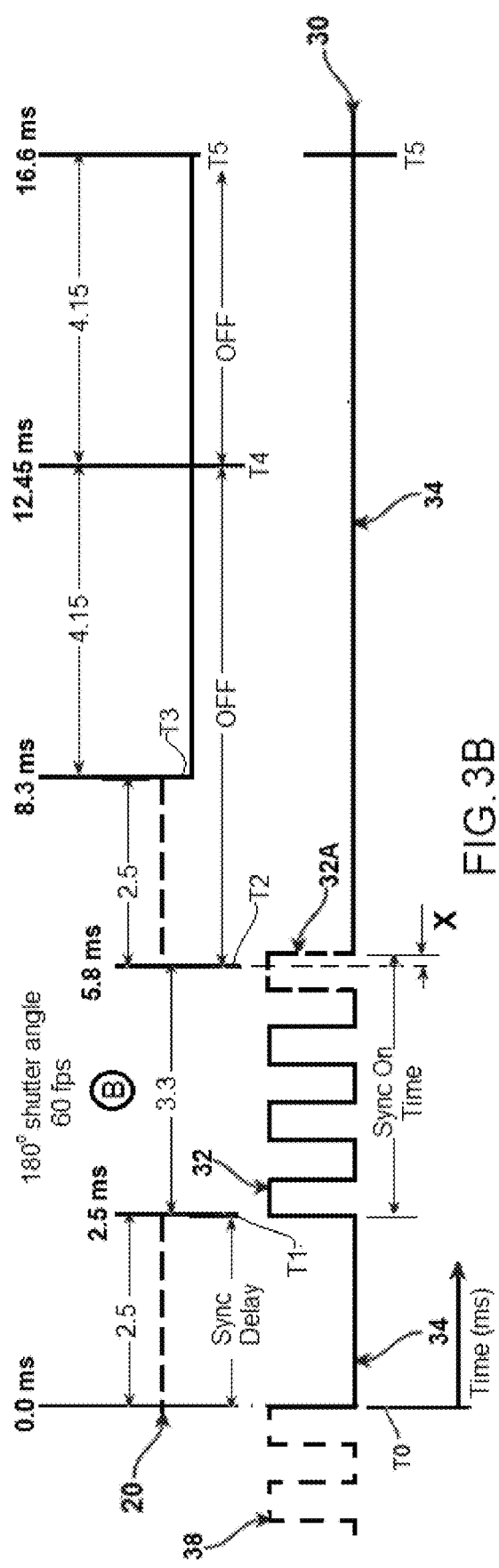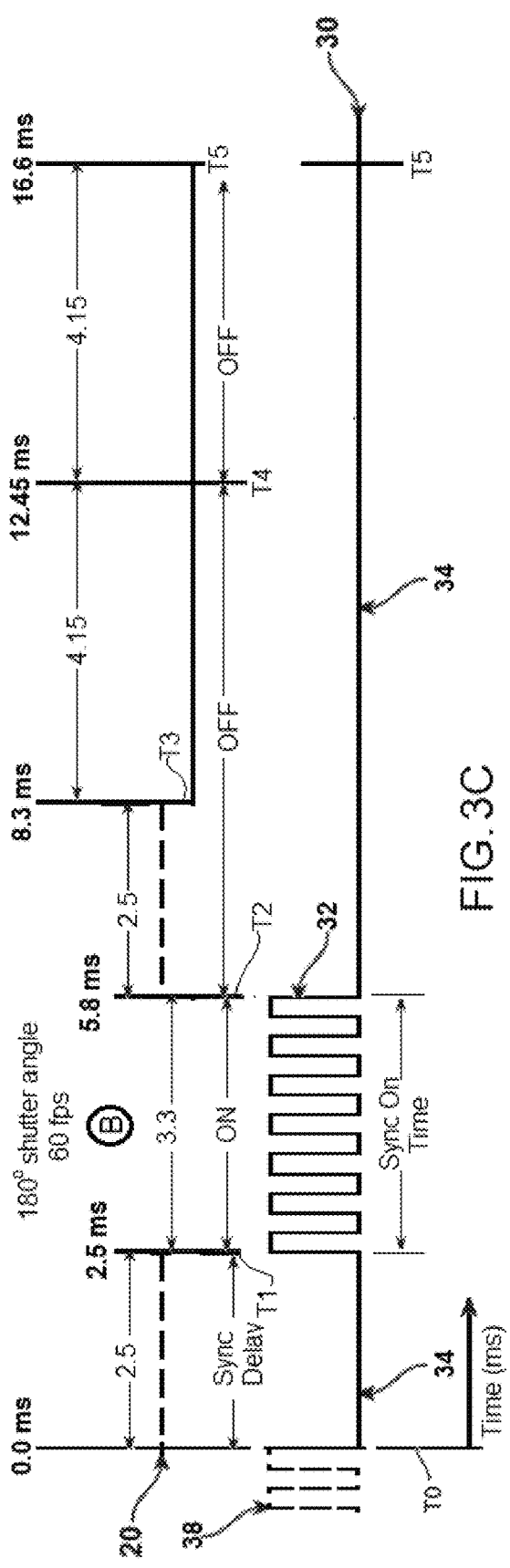

ELIMINATION OF ARTIFACTS IN CAPTURED IMAGES OF LED TILE DISPLAYS

RELATED APPLICATION DATA

This application is a bypass continuation patent application of PCT/US2021/046484, filed on Aug. 18, 2021, which application claims the benefit of priority of U.S. Nonprovisional Patent Application Ser. No. 17/320,135, filed May 13, 2021 (now U.S. Pat. No. 11,310,436), and U.S. Provisional Patent Application Ser. No. 62/706,500, filed Aug. 20, 2020, and titled "Elimination of Artifacts in Captured Images of LED Tile Displays", which is incorporated by reference herein in its entirety.

FIELD OF THE DISCLOSURE

The present disclosure generally relates to the fields of LED displays and motion picture capture. In particular, the present disclosure is directed to systems and methods for motion picture capture of pulse width modulation (PWM) driven displays while minimizing or eliminating artifacts resulting from shutter timing in the capture device.

BACKGROUND

Motion picture capture is frequently done using cameras employing a "rolling shutter" in which the shutter scans across the scene captured in a single frame. This type of image capture can be simulated electronically in digital cameras. Global shutters also may experience a rolling shutter-like effect depending on the shutter speed setting. In motion picture capture, a common shutter speed is 180 degrees, meaning that 180 degrees out of a 360 degree rotation cycle exposes the camera sensor.

When capturing moving images with this type of camera device, LED display tiles can be difficult to capture properly without artifacts because LED displays employ pulse width modulation (PWM) control with LEDs pulsing at very different rates relative to the camera's exposure cycle. The LED pulses are extremely rapid and can often only partially refresh while a scanning type shutter is in a fully open position. The same challenges are presented by other types of PWM driven displays.

Typically, LEDs are grouped in multiplexing scan groups with as few as four (4) LEDs in a group or as many as thirty-two (32) or more. This means that as a result of the PWM control, only one-fourth (¼) to one-thirty-second (¹⁄₃₂) of the LEDs are on at any given moment in time. The misalignment of the camera shutter and scan groups of LEDs thus can create pulsing or banding artifacts on the camera's output as shown in FIG. 11 below. (Note that in the image captured in FIG. 11, the camera was set at a shutter angle of about 11 deg. in order to make the artifacts more apparent only for the purpose of clarity of illustration here).

With the increasing use of LED display walls as backgrounds for television and movie production, there is a need for new solutions that provide improved image capture and reduce computing resources necessary to achieve high-quality captured images.

SUMMARY

In one implementation, the present disclosure is directed to a method of image capture of a scene including at least one light emitting video display wherein video output of the display is driven by a video control signal, wherein the image capture comprises a series of image capture frames. The method includes dividing each image capture frame into a plurality of time slices; initiating image capture with an image capture device at an initial time with the video control signal set to off at the initial time; setting the video control signal to on after a first partial shutter period of the image capture device; setting the video control signal to on during time slices aligned in whole or in part with the open shutter periods; setting the video control signal to off at or before a second partial shutter period of the image capture device; setting the video control signal to off during time slices aligned in whole or in part with the partial shutter periods; and repeating each setting and maintaining of the video control signal through a series of image capture frames.

In another implementation, the present disclosure is directed to an image capture system, which includes an image capture device configured to capture a moving image of a scene, the image capture device comprising a shutter mechanism capturing images in a series of frames, each frame including an open shutter period preceded and followed by partial shutter periods; a system display device that includes: a light emitting display surface configured to display images within the scene captured by the image capture device, and a driver configured to drive the light emitting display surface with a video control signal; and a control device that: sets the video control signal to off during partial shutter periods of the image capture device, sets the video control signal to on during open shutter periods of the image capture device; divides each image capture frame into a plurality of time slices; sets the video control signal to off during time slices aligned in whole or in part with the partial shutter periods; and sets the video control signal to on during time slices aligned in whole or in part with the open shutter periods.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein:

FIGS. 3A, 3B and 3C are timing diagrams illustrating examples of PWM timing and synchronization control methods according to embodiments of the present disclosure.

DETAILED DESCRIPTION

The present disclosure describes systems and methods for moving image capture from video displays that use pulse width modulation (PWM) control. In the disclosed systems and methods, artifacts appearing in the captured images due to unsynchronized interaction between camera shutter/exposure timing and the timing of the display PWM control signal are reduced or eliminated by precisely controlling display on and off times. Systems and methods disclosed herein divide or logically "slice" each frame of video into multiple sub-frame partitions ("time zones"), and then each partition can be individually controlled relative to the image capture device shutter/exposure timing to allow precise timing control of the PWM signal relative to the shutter timing of the image capture device.

While LED displays with passive PWM control are referenced herein in the exemplary embodiments for illustration purposes, as will be appreciated by persons skilled in the art, the principles of the present disclosure are equally applicable to other display types. Examples of other display types include, but are not limited to, organic light-emitting diodes (OLED), polymer light-emitting diodes (PLED), active-matrix controlled light-emitting diodes (AMOLED), liquid crystal displays (LCD) or light-emitting electrochemical cells (LEC). The scope of the present disclosure and appended claims is therefore not limited to the illustrative LED display examples.

Figure 1:
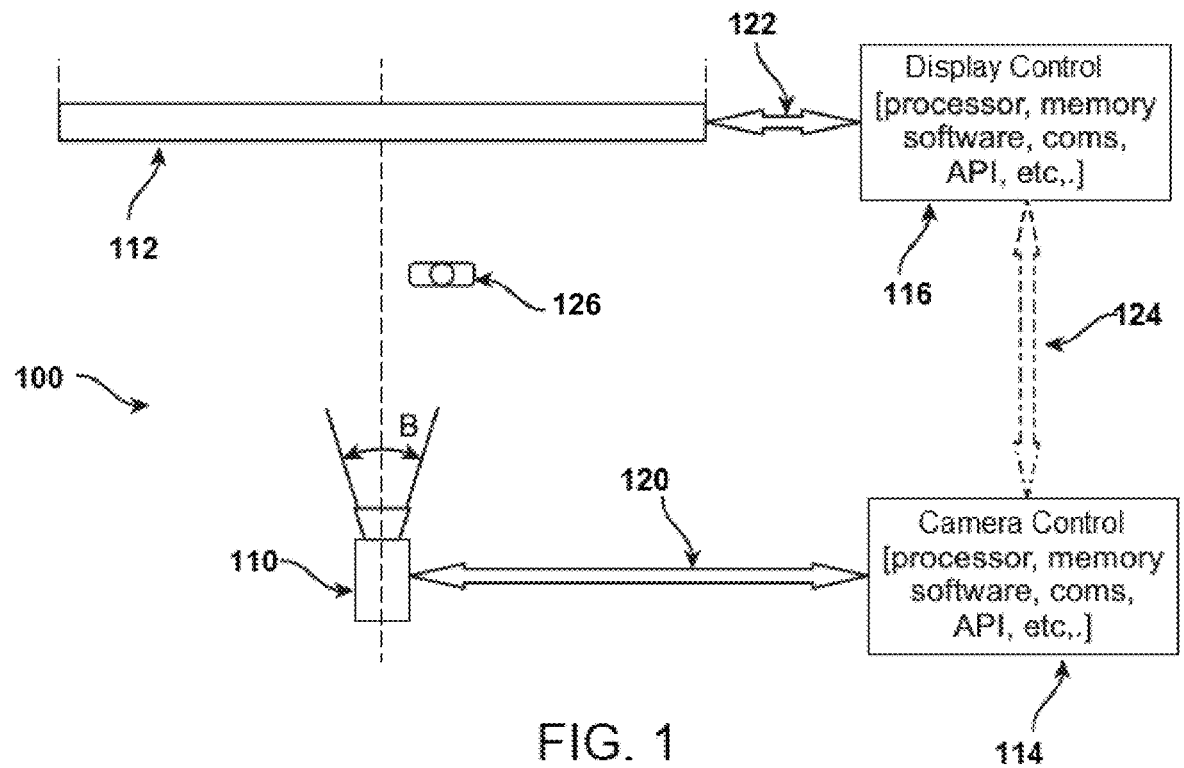
FIG. 1 schematically depicts a system according to embodiments disclosed herein.

FIG. 1 illustrates basic components in an example of a system according to the present disclosure. As shown therein, system 100 includes an image capture device 110, such as a video camera with a digital image sensor. Image capture device 110 is used to capture a moving scene, which includes within the camera field of view (B) LED display 112 and may optionally include a presenter (126) or other live action scene occurring in front of the display. LED display 112 may comprise large video display walls formed by assembling panels containing arrays of LED pixels. The basics of constructing and controlling such large LED video display walls are generally understood in the art. International application No. PCT/US2020/057385, filed Oct. 26, 2020, by the present Applicant, entitled "Unlimited Pixel Canvas For LED Video Walls" describes embodiments of next-generation large LED video display walls with improved structures and control, and is incorporated by reference in its entirety herein. Image capture device 110 and display 112 are controlled by camera controller 114 and display controller 116, respectively. Each controller comprises one or more processors, memory, software, communications, API and other components as described in more detail hereinbelow. Bi-directional communication links 120 and 122 between the controllers and the controlled devices may be wireless or wired. Optionally, communication link 124 may be provided between controllers 114 and 116.

Figure 1A:
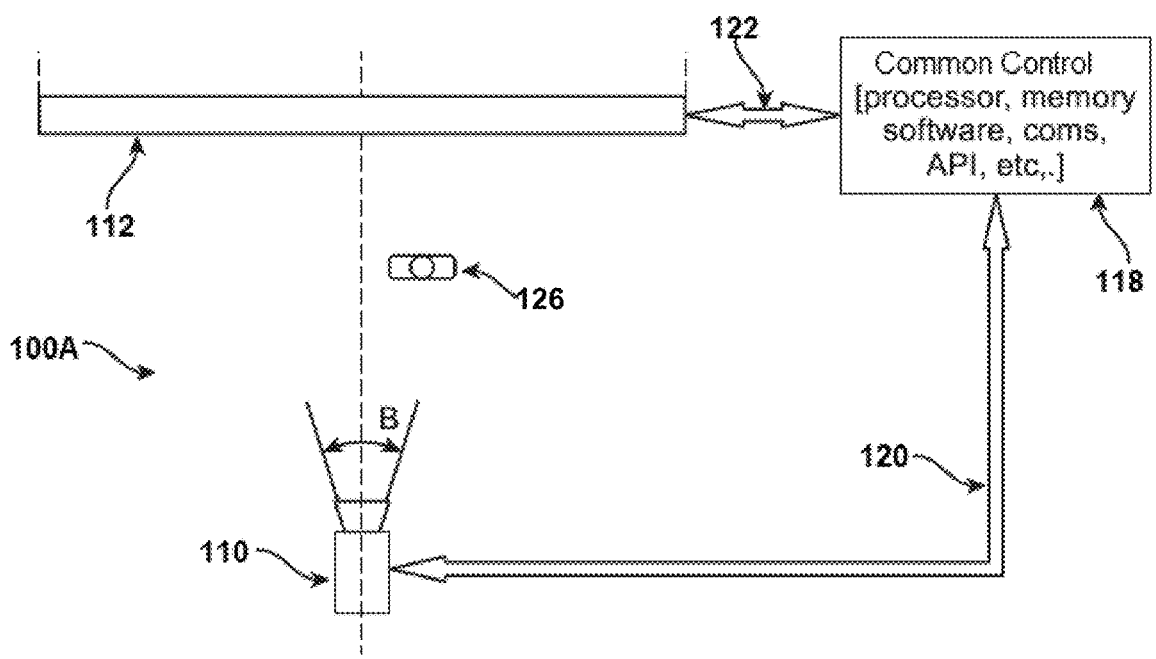
FIG. 1A schematically depicts an alternative system according to embodiments disclosed herein.

FIG. 1A illustrates an alternative system embodiment 100A, in which image capture device 110 and display 112 are controlled by common controller 118. Controller 118 may be configured generally in the same manner as controllers 114 and 116 and as further described herein below. Again, wireless or wired communication links 120 and 122 provide bi-directional communication between the controller and controlled devices.

Table 1 below provides a basic illustration of the shutter timing for an image capture device such as video camera 110. This basic illustration describes shutter timing for both mechanical, "rolling shutter" type capture devices, such as traditional motion picture cameras, and for various types of digital capture devices employing digital image sensors. As shown in Table 1, there are three distinct camera shutter states during the time of a single frame, wherein the "C" state represents a time window when the shutter is fully closed (closed shutter period), the "O" state represents a time window when the shutter is fully open (open shutter period), and the "P" state represents a time window when the shutter is opening or closing such that the amount of light permitted to reach the sensor during these time fields will vary with the shutter movement (partial shutter period).

TABLE 1

| camera shutter zones |
| --- |
| CCCCC PPP OOOOOOOOOOOOOOOOOOOO PPP CCCCC |

The duration and timing of each of these time windows is specific to particular image capture devices and can vary from device to device. The teachings of the present disclosure thus apply to any image capture device employing a shutter mechanism, whether mechanical or digitally simulated, that presents a form of the shutter states shown in Table 1.

Figure 11:
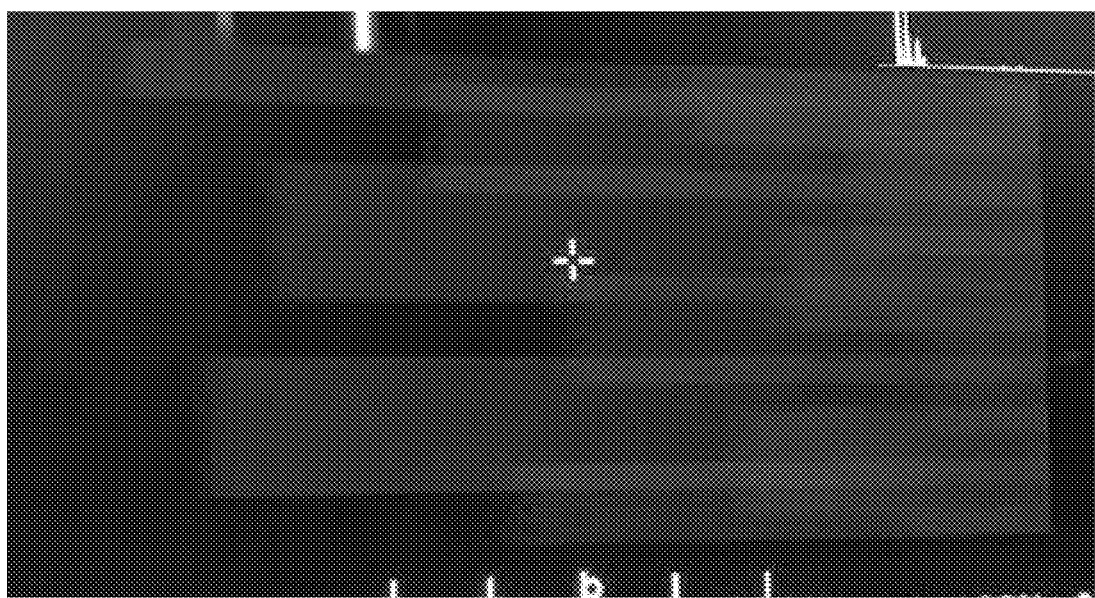
FIG. 11 is an image capture of an LED tile video display presenting artifacts due to use of an uncompensated-for rolling shutter.

During P time fields, also referred to herein as "partial shutter," not all photons emitted by the source reach the image sensor, whether film or a digital sensor. In order to reduce or eliminate artifacts created by the pulses of a PWM controlled LED display, as shown in FIG. 11, the LED tile should not output any light during the P time fields. During the O time fields the LED tile should complete all PWM refresh cycles, and during the C time fields no output from the LED tiles is needed. However, if the LED tile is also being observed live by human viewers (in addition to the image capture device), a comfort level light output may be emitted during the C time fields so as to avoid a flicker effect visible to the human eye. It is to be further noted that the time intervals for the P and O time fields may change value based on fixed camera parameters such as characteristics of the digital sensor and selectable camera parameters such as shutter angle settings used to generate the image of the LED display.

Figure 2:
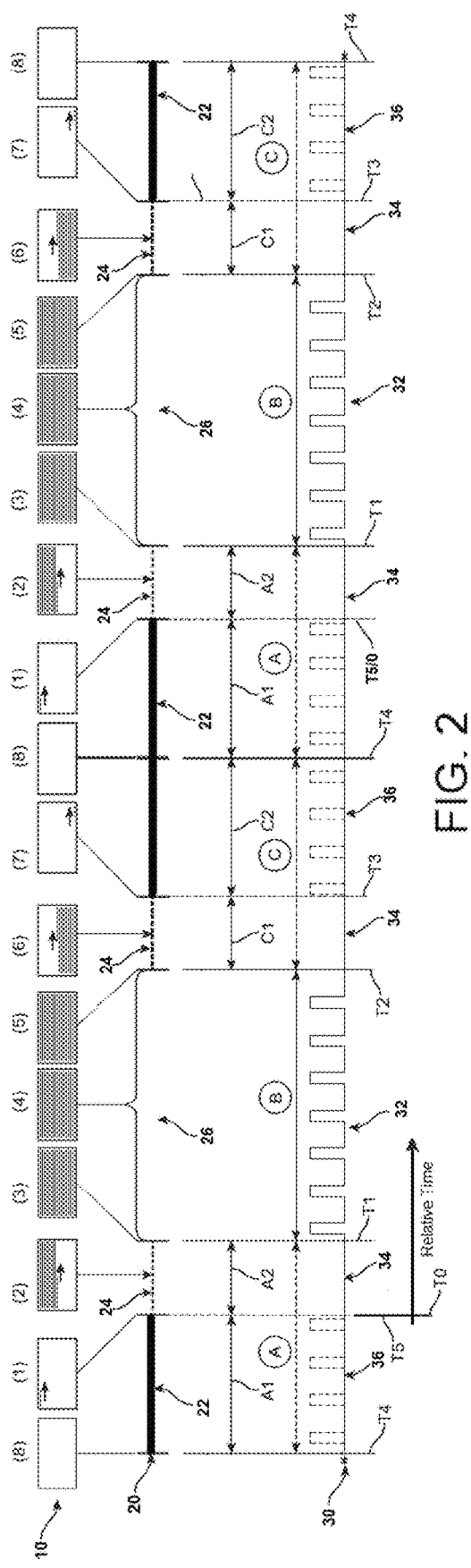
FIG. 2 is a timing diagram illustrating shutter timing relative to timing of PWM control of an LED tile display according to an embodiment of the present disclosure.

FIG. 2 illustrates timing control of the LED PWM control signal relative to a digital camera sensor charge state across two camera shutter periods for some embodiments disclosed herein. Top row boxes 10 indicate the digital sensor charge states (1-8), beginning at a relative time reference ($T_0$), i.e., the beginning of a single camera shutter period. The camera shutter period begins at $T_0$ and ends at $T_5$, which is also $T_0$ for the next shutter period. A single shutter period corresponds to a single video capture frame. Wider black line 20 indicates simulated shutter open vs. closed states, wherein the solid black line portion 22 represents fully closed (C in Table 1), the dashed line portion 24 represents partially open (P in Table 1), and the gap portion 26 represents the fully open state (O in Table 1). Line 30 represents the PWM control signal to the LED display and the various arrows (A through C) represent different time control windows across the shutter period.

The shutter period, with reference to the state-of-charge of the digital sensor, occurs as follows:

(1) At the beginning of each exposure the sensor resets all photosites to empty them of any charge. Conventionally, and from the perspective of the camera not taking into account the teachings of the present disclosure, this has been thought of as the start of the exposure time.

(2) Photosites are reset one after the other, for example, starting with the top left photosite, creating a partial charge state. The reset process scans down line by line to the bottom right. During this partial charge state, only a portion of the light created by an image source is received by the camera sensor. (Some sensors scan in different directions but the effect is the same).

(3) Fully open exposure time begins at full photosite reset. This is the beginning of time window B.

(4) During the fully open exposure time, the photosites accumulate charge based on how much light is received from the image source. The more light falls on each photosite, the higher the charge. Subject to other camera settings, such as aperture size, all light emitted by the source is received by the sensor during this time.

(5) Once the fully open exposure time is over, the charge in each photosite is measured and read out. This is the end of time window B.

(6) The read-out also occurs starting from top left. Again, this is a partial charge state, during which time only a portion of the light created by an image source is received by the camera sensor.

(7) The read-out scans down line-by-line to the bottom right until all photosites are read, ending the partial charge state.

(8) At the end of the shutter period, after the read-out of the photosites, there generally will be a time period during which the photosites convert light into a charge. Typically during this time period any captured charge is ignored until the next reset. The length of this time period will depend on the specific camera/sensor design, setup and control.

During time window B, when the shutter is fully open with the digital sensor receiving full charge (sensor states (3)-(5), corresponding to the O time field in Table 1), LED PWM control signal 30 is delivered at its full on state 32, which is a pulse control configured to present the desired tile brightness as is understood for PWM control of LED tile displays in general. It is the partial shutter periods, e.g., sensor states (1)-(2) corresponding to time window A2, and sensor states (6)-(7) corresponding to time window C1, during which the LED PWM control signal 30 must be set to off 34 in order to minimize or eliminate artifacts in the moving image captured from the LED display. During times when the shutter is fully closed, e.g., digital sensor state (8) corresponding to time windows C2 and A1, from the perspective of image capture alone, no PWM signal is necessary. However, if visual appearance to a live, in-person viewer of the display is a concern, then an optional PWM signal 36 may be delivered to the display, which may correspond to the overall video stream or may present a momentary static color or other still image to smooth or eliminate any visually perceptible flashing of the display.

In general with respect to FIG. 2, time T0 represents the beginning of a shutter period for a single frame. Time T1 represents the beginning of the fully open shutter window during which the LED tiles are to be at full display values, and time T2 represents the end of the fully open shutter window. Time T3 represents the end of the shutter closing state and beginning of the closed shutter duration. Time T4 represents the midpoint of the camera sensor off time within a shutter period. Time T5 represents the end of a shutter period and corresponds to time T0 for the next subsequent shutter period. The length of time window B (the O time field in Table 1) when PWM control is set on thus corresponds to T2-T1. As explained further below, the minimum PWM off time for elimination of artifacts corresponds to time windows A2 (T0-T1) and C1 (T2-T3).

While the LED display should be on as much as possible while the digital sensor is fully exposed, i.e., time window B, which provides a good image on camera without artifacts, a strobing effect in person can be created as mentioned if the display or large sections of the display are not also on during the remainder of the shutter period. However, balancing of artifact elimination with suppression of strobing effects creates added complexity because LEDs of the display still must be cycled off at least during the partial shutter state of time windows A2 and C1. Thus, optimally there are very short and precise time windows during which the PWM control signal should be off to present good on and off-camera appearance.

Figure 3A:
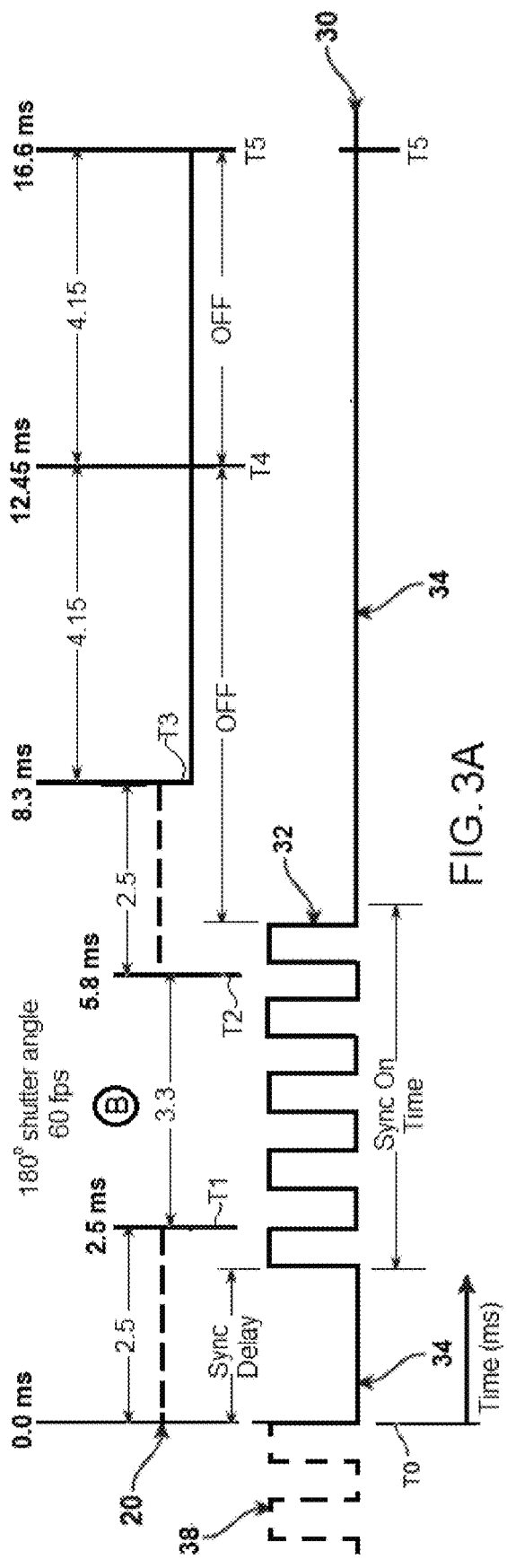

To further illustrate the principles of the present disclosure, FIGS. 3A, 3B and 3C present examples of synchronization of camera settings with PWM signal timing based on a camera set to a 180 degree shutter angle at 60 frames per second (fps). With these settings, as is known in the art, the camera frame time is 16.6 milliseconds (ms) and the nominal exposure time is 8.3 ms. As explained above, the nominal exposure time includes the camera sensor charge and discharge times. Thus, if the camera sensor has a total charge/discharge time of 5.0 ms, then the time window available for clear video capture is 3.3 ms (i.e. time window B), starting after the initial 2.5 ms sensor charge time. However, if the camera manufacturer does not publish the timing specifications for the sensor, the operator may not know how the total exposure time of 8.3 ms is allotted between charge/discharge and fully open, and therefore not know when to set the PWM signal to on and off as described above.

To solve this problem, in certain embodiments, the operator may use visual feedback from the captured image to determine the correct timing settings as illustrated in FIGS. 3A and 3B. As illustrated therein, timing synchronization begins at T0, when the camera is turned on or otherwise begins capture of the initial frame. Before T0, the display PWM signal 30, here represented as a 1000 Hz PWM signal at 50% duty cycle, initially may be on or off at 38 prior to the first camera frame. Portions of the PWM signal at 34 are off and portions at 32 are on.

Given the chosen frame rate and camera shutter angle, based on familiarity with the system equipment and its performance, an operator may make an initial estimation of a Sync Delay time and a Sync On time. The Sync Delay time is the time prior to the fully open shutter window B, i.e., the time window A2 between times T0 and T1 in FIG. 2 when the PWM signal should be off to avoid artifacts in the capture image. The Sync On time is the time following the Sync Delay time corresponding to fully open shutter window B, i.e., time between T1 and T2 in FIG. 2, when the PWM signal should be on for optimum image capture. For the example camera system described in the preceding paragraph, FIG. 3A illustrates the results of an initial Sync Delay time estimate of 2.0 ms and initial Sync On time estimate of 5.0 ms. After initiating image capture with these initial Sync time settings, the operator observes the captured image to determine the presence of artifacts in the captured image resulting from the display being on during one or both the partial shutter states of A2 and C1 (as identified in FIG. 2).

FIG. 3A shows that an observer would see artifacts in the captured image at both the leading edge and trailing edge of the fully open shutter window B. Artifacts at the leading edge of the fully open shutter window B would be created by the first PWM pulse 32 falling at the end of the 2.0 ms Sync Delay time, but before time T1, because the light emitted in that first pulse would be only partially captured by the image sensor in the partial charge state. Similarly, artifacts at the trailing edge of the fully open shutter window B would be created by the last PWM pulse 32 falling after the close of fully open shutter window B, after time T2, again in the partial charge (discharge) state of the camera sensor between times T2 and T3. By identifying these artifacts in the captured image, the operator knows that both the Sync Delay time is too short and that the Sync On time is too long for that specific camera set up.

With the knowledge gained from an initial Sync time estimate, the operator may make a revised estimate, increasing the Sync Delay time to further postpone the PWM on signal 32 (to eliminate leading edge artifacts) and decreasing the Sync On time to further advance the PWM off signal 34 at the end of the fully open shutter window B (to eliminate trailing edge artifacts). Thus, as illustrated in FIG. 3B, the Sync Delay time may be set at 2.5 ms and the Sync On time set at 3.5 ms. The Sync Delay time of 2.5 ms turns on the PWM such that a first on pulse 32 falls at time T1, the beginning of the fully open shutter window B. With this setting the operator will observe no leading edge artifacts in the captured image and thus know that time T1, the beginning of the fully open shutter window B, has been correctly identified. As also illustrated in FIG. 3B, the Sync On time of 3.5 ms causes the last on pulse 32A of PWM signal 30 to fall across time T2 by, with a time portion X of pulse 32A falling within the following partial shutter period (window C1 in FIG. 2). In this specific example, the overlapping time portion X of final pulse 32A is 0.2 ms. Depending on a variety of other factors in camera set up and display parameters, the 0.2 ms of pulse 32A falling after time T2 may or may not create trailing edge artifacts that are significant enough to unacceptably degrade the appearance of the captured image.

In the event that trailing edge artifacts created by the portion of pulse 32A falling after time T2 unacceptably degrade the captured image, there are a number of control options available in alternative embodiments. In general, depending on the PWM frequency and duty cycle, the pulses may not align precisely with the available open shutter window B. For example, as in FIG. 3B, with the PWM signal driven at 1000 Hz and 50% duty cycle, pulse leading edges fall 1.0 ms apart and each have an on time of 0.5 ms. With camera sensor timing parameters fixed as in this example, physical constraints of the system mean that it is not possible to turn on the PWM signal at T1 and then off exactly at T2, 3.3 ms later because this PWM signal can only be controlled in 0.5 ms segments. One solution is to further decrease the Sync On time by a sufficient amount to move the last pulse so as to fall entirely within fully open shutter window B. In this particular example, that means decreasing the Sync On time to something less than 3.0 ms, so that only three full pulses occur during fully open shutter window B between times T1 and T2. However, such a solution may, in some cases, degrade other aspects of the captured image, such as brightness, because it may not maximize use of available fully open shutter time.

In some instances, another possible solution is to adjust the PWM signal so that the pulses more precisely align with the fully open shutter window B. In one option this can be done by altering the duty cycle of the PWM signal while maintaining the frequency. Decreasing the duty increases or decreases the amount of on time for each pulse without changing the leading edge separation. Thus, with the same Sync Delay time and Sync On time shown in FIG. 3B, a 1000 Hz PWM signal at 30% duty cycle rather than 50%, would put four full on pulses within the fully open shutter window B, with no portion of the final pulse falling after time T2. However, decreasing the duty cycle may not be an option in some situations as it also has an effect on the displayed images. Another option, if permitted by hardware constraints, such as capabilities of LED tile controllers, is to adjust the PWM frequency to align the pulses with the time window. One example of such an adjustment is shown in FIG. 3C. In this case, increasing the PWM frequency from 1000 Hz to 2000 Hz (maintaining the 50% duty cycle) allows the same Sync Delay time of 2.5 ms with a Sync On time of 3.3 ms without placing a pulse after time T2 because the trailing edge of the final pulse 32 falls at 3.25 ms of the 3.3 ms fully open shutter window B. As will be noted by persons skilled in the art, the 1000 Hz and 2000 Hz PWM signals used in these examples are convenient for illustrating principles of the present disclosure in a simplified manner. In practice, high resolution video walls may operate at frequencies of 8000 Hz or higher. The principles of the present disclosure apply equally to systems operating at such higher frequencies.

In further alternative embodiments, a convenient way of implementing the control methodology of the present disclosure in processor-controlled systems is to create a plurality of regular time control slices within each camera frame. Because each camera model and manufacturer will vary shutter and/or charge state timing, it can be desirable to create these time control slices as virtual "time zones" within each shutter period in order to individually select which time slices should display video (PWM on) and which should not (PWM off). Theoretically, the larger the number of time slices, the finer the control possible. However, the number of time slices may be limited based on the capability of the LED tile (combination of processing power, driver integrated circuit, etc.).

Figure 4:
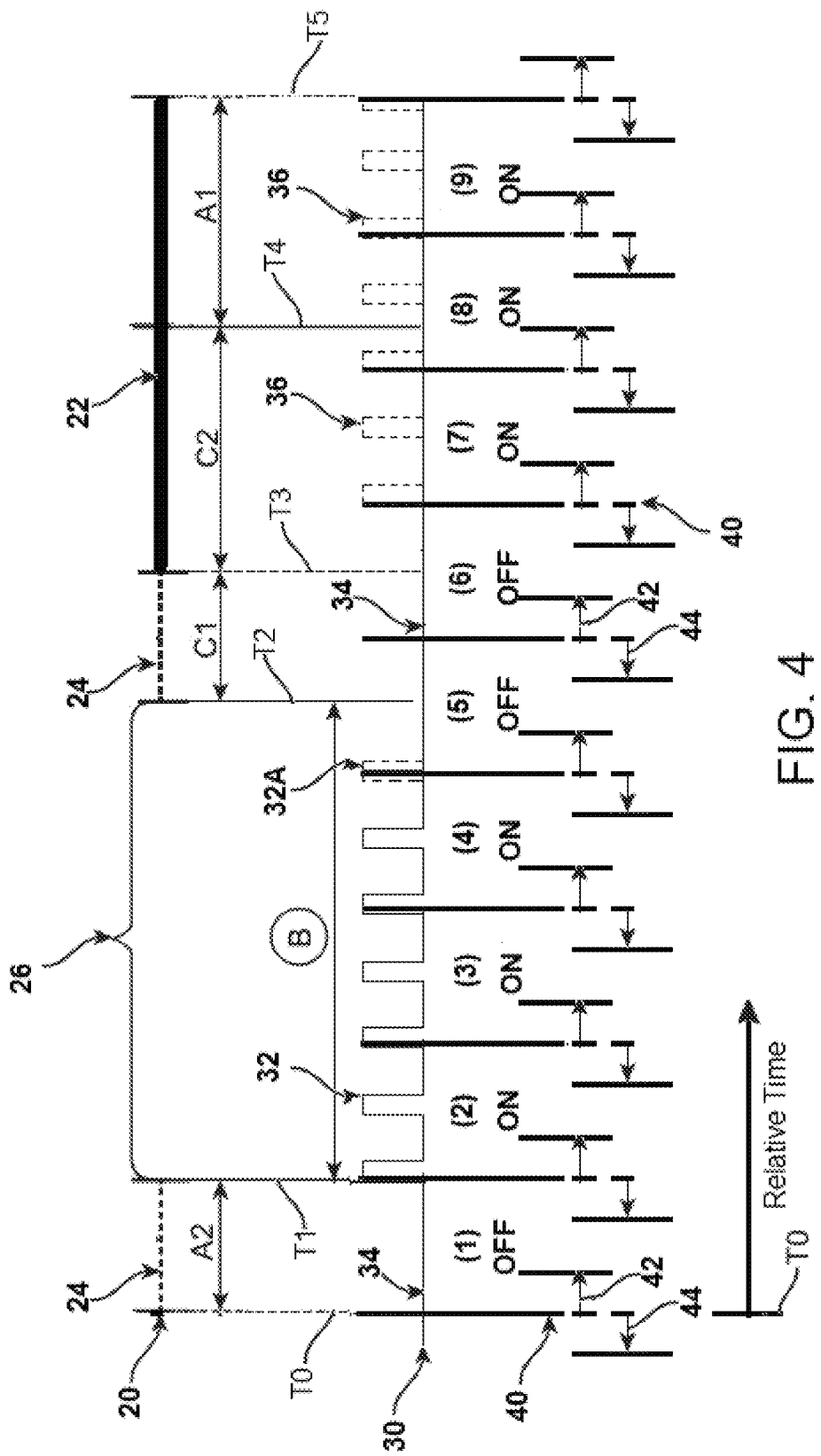
FIG. 4 is a timing diagram illustrating timing of an electronic rolling shutter relative to timing of PWM control of an LED tile display according to another embodiment of the present disclosure.

An illustration of the use of such virtual time control slices is presented in FIG. 4, wherein nine equal time control slices are overlayed on a single shutter period timing diagram. The individual time control slices are designated as (1)-(9). As shown therein, reference lines 40 indicate the beginning/end of each time control slice. In this example, in order to avoid unwanted artifacts in the captured video, PWM signal 30 is set to off 34 during at least time control slices (1), (5) and (6). This solution fits well with LED PWM methodology and typical camera systems, as well as being tunable across a variety of products. Additionally, during time control slices (7)-(9), aligned with the fully closed camera shutter time, the PWM signal is optionally on 36 to display video or a static image/color to smooth strobing effects, while having no impact on the captured image.

With higher performance LED display tiles more (smaller) time control slices can be created, allowing for more precise control of the on/off switching of the PWM control signal. For example, persons skilled in the art may recognize that the end of the fully open shutter window B in FIG. 4 (T2) falls at approximately the mid-point of time control slice (5). Using the nine time control slices as shown, a decision must be made as to whether to set the PWM control signal on during time control slice (5), which may create artifacts during the partial sensor charge state, or set PWM control signal off, which then does not fully utilize open shutter window B and may compromise characteristics of the captured image. To avoid the necessity of such a tradeoff, it may be desirable in some situations to double the number of time control slices so as to more precisely align the PWM control with the shutter timing. In this example, if eighteen time control slices were used instead of nine as shown, the end of the seventh zone would align with time T2 and thus allow for at least one additional on pulse of the PWM control signal within fully open shutter window B.

In a further alternative embodiment, a Sync Phase parameter may be incorporated to allow adjustment of the phase of the camera-to-LED timing. It may be preferred for both the camera and PWM timing to be "locked" together, where the rate of camera exposure is the same as the rate of the PWM on/off cycles. However, while these systems may update at the same rate, often they will not be in phase, yet they will have a consistent phase offset. Thus, in order to ensure that the time zones as described above are aligned as best as possible with the camera sensor fully open/partial-opening/closing periods, a Sync Phase parameter can nudge the phase of the LED on/off cycles. An embodiment of such a Sync Phase parameter is graphically illustrated in FIG. 4, wherein line 40 represents the beginning of an individual time control slice as described above and the Sync Phase parameter is represented by delay time 42 or advance time (negative delay) 44. The Sync Phase parameter may be a software-implemented feature in the video processor/control system that allows shifting of the time zones as shown, either adding nanoseconds and shifting to the right or subtracting nanoseconds and shifting to the left.

Based on the teachings of the present disclosure, users of the disclosed systems and methods, such as filmmakers, artists or camera operators, may select their preferred camera shutter angles based on desired artistic effect, lighting conditions, lensing, set design, etc. In one control aspect, display/video signal PWM cycles can be reduced and pulses somewhat widened to reduce the number of timing zones, for example increasing the period of the zones. In another control aspect, desired shutter angle versus available slice refresh times can be adjusted. By shifting the timing of the video signal and the camera shutter angle, desired display timing slices are captured along with any live action in the foreground. Embodiments disclosed herein thus provide far more control options than prior art systems by facilitating complimentary control of both the display PWM signal and camera timing/shutter angle. Thus, while the display/video signal control options may be limited by the number of PWM cycles that can be shown per frame period, when combined with shutter timing/angle control, virtually unlimited artistic effects can be created based on user preference.

Figure 5:
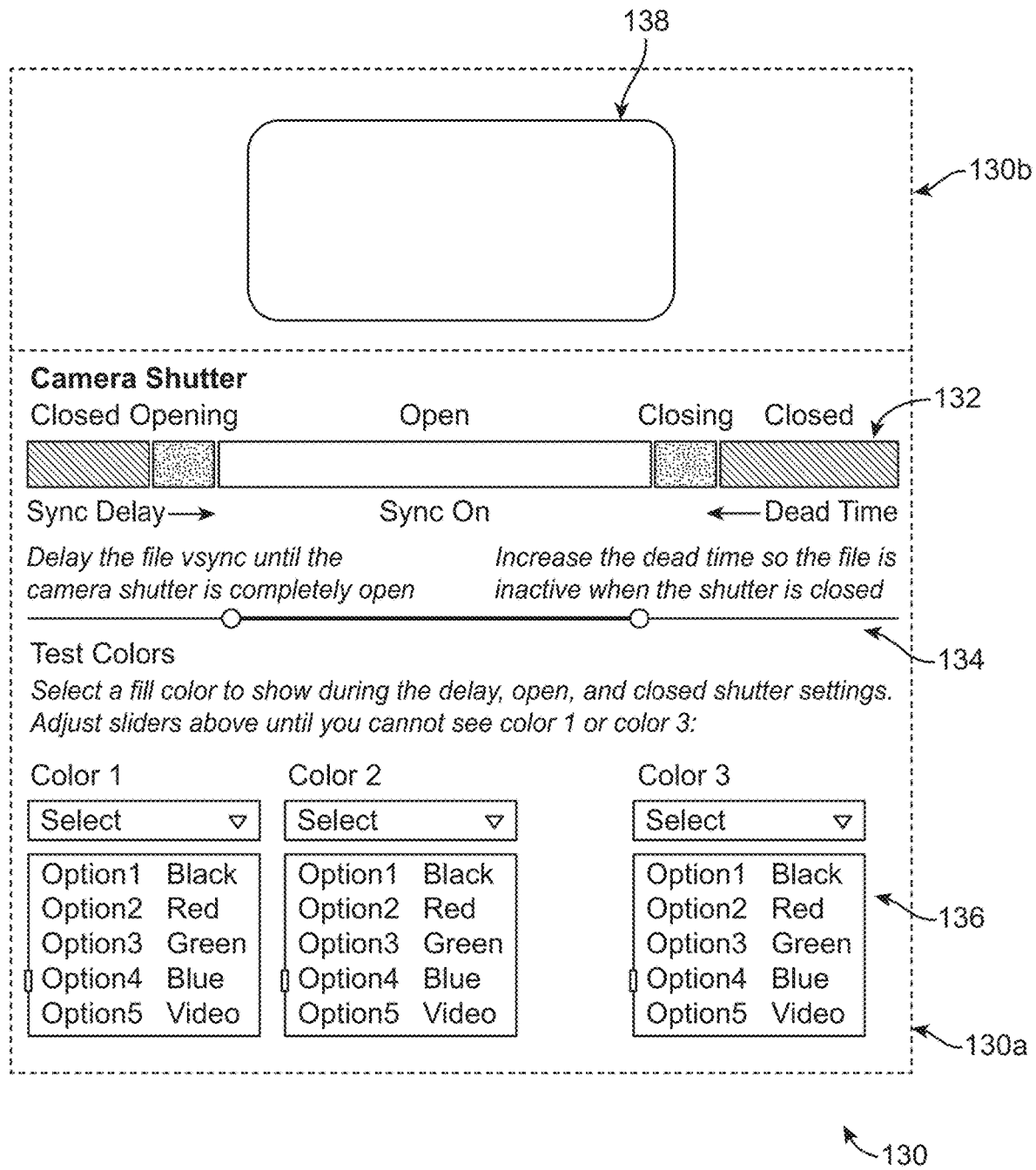
FIG. 5 illustrates an embodiment of a graphical user interface according to the present disclosure.

In further aspects of the present disclosure, user interfaces are provided to aid with finding correct synchronization timing. In one embodiment, as shown in FIG. 5, user interface 130 can be used to facilitate user control of the Sync Delay time and Sync On time parameters based on visual feedback of the images produced during a set-up routine. Also, using interface 130, a control system is configurable to show solid colors during specific timing slices. Display of easily identifiable solid colors on the display allows visual verification of timing alignment as described above in connection with FIGS. 3A and 3B. For example, if red is displayed for the first timing slice, followed by green for the middle timing slices, and then a trailing red in the final timing slice, the synchronization timing can be more easily adjusted using these reference colors so that the camera only captures a red+green for the displayed reference image.

User interface 130 allows a user to precisely select a desired PWM control signal start, end and on time for the LED tile using a display controller such as controllers 116 or 118. User interface 130 includes a graphical representation of shutter timing 132 for a specific image capture device to be used. Shutter timing for specific cameras can be obtained from manufacturer's specifications or may be set in the camera, for example via the camera controller. In some embodiments, the image capture device may directly communicate with the LED display control system to automatedly input shutter timing information as shown, for example, in FIG. 1A. Slider bar 134, which may be a virtual, touch-screen slider, allows the user to set the LED PWM control on time to correspond to the shutter opening times and to fine tune the relationship to achieve desired appearance of the image produced with the camera. Each end of the slider bar may be moved independently to alter the sync delay at the beginning of the shutter frame and the dead time at the end. Visual feedback from the display allows determination of the slider position, i.e. Sync Delay value, that provides a desired appearance in the captured video stream.

Test color selection section 136 of user interface 130 allows more fine tuning of the LED sync delay with the shutter opening times using the color selection boxes for colors 1, 2 and 3. In this illustrative example, three color selection boxes are provided, corresponding to the Sync Delay time, the Sync On time and the closed/dead time at the end of the frame period. Additional color selection boxes may be provided based on user preference. Alternatively, rather than static single colors, any static image may be displayed. Providing selectable color options synced to specific shutter periods can be highly useful in finding the closed/opening/open/closing/closed portions of the camera shutter, especially when the camera manufacturer does not publish the details of how and when the shutter is open. For example, a user could set Color 1 to "Red" and move the Sync Delay slider 134 forward and backward until the Red color is just barely visible in the "Open" region of the shutter period (i.e. time period B in FIG. 2). Doing so allows precise identification and setting of the beginning of the LED PWM "on" time, after which the Color 1 can be reset to Black. Next, Color 3 can be set to another color, such as "Green", and the Dead Time (PWM "off" cycle) can be adjusted forward and back until the captured image is just barely visible in Green and thereafter Color 3 can be reset to Black. To confirm these settings made by the slider, Color 2 can be chosen to confirm that the Sync On time aligns the image capture device to be recording and outputting the chosen color without artifacts. Once the settings to eliminate artifacts are validated, "Color 2" would be reset to "Video", whereafter the display and image capture device can be used normally with LED display synchronized to the shutter period of the image capture device so as to avoid artifacts in the captured image stream.

Figure 6:
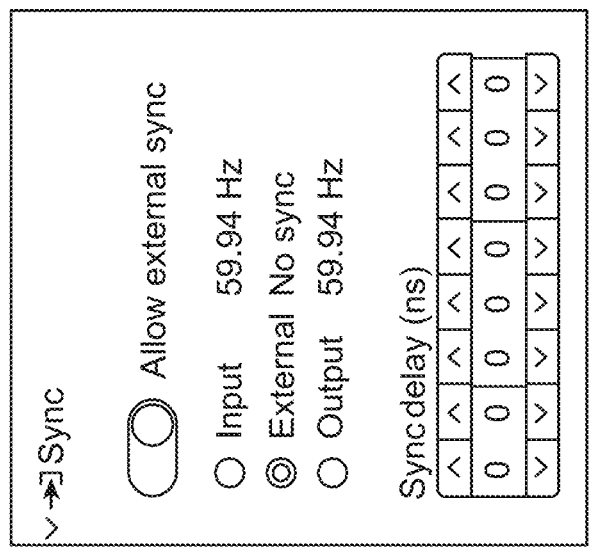
FIG. 6 shows another embodiment of a user interface configured to allow direct time control of a Sync Delay parameter.

In situations where the specific camera timing is not known, slider bar 134 of user interface 130 (FIG. 5), with color selection boxes 136 can be used to visually identify the available open shutter window and set PWM timing as described. Alternatively, where the specific camera timing is known (e.g. shutter opening/closing time and charge/discharge time), the available shutter open window can be precomputed and the appropriate PWM cycle length and off time set with an alternative user interface as shown in FIG. 6.

In some embodiments, user interface 130 may be configured as a graphical-user interface (GUI) presented on a user interface display device based on interface instructions executed by a system processor. Such a GUI may be presented with multiple GUI regions, for example, a first GUI region 130a, containing the control elements as discussed above, and a second GUI region 130b, containing a display window 138 presenting the captured image. FIG. 11 presents an example of a captured image in a GUI display window such as window 138.

Figure 7:
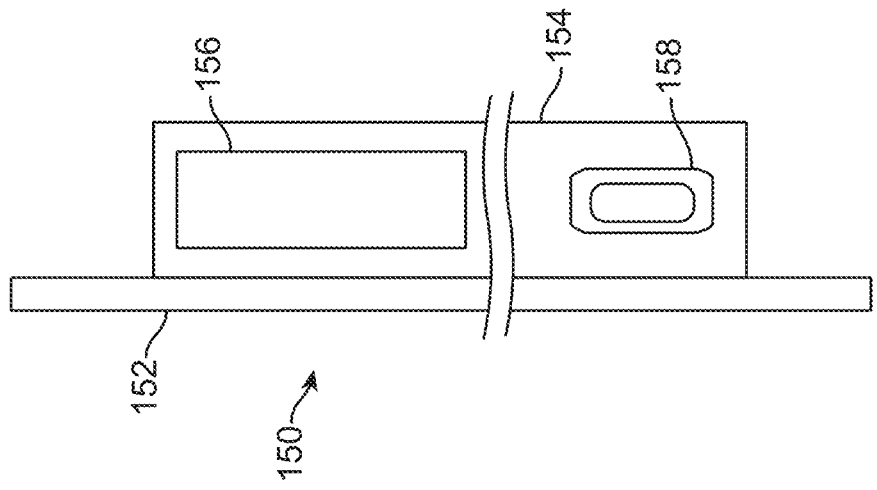
FIG. 7 is a schematic side-view of an LED tile.

In another alternative embodiment, aspects of the synchronization control may be embedded in individual tiles in order to reduce bandwidth requirements for tile-to-tile and tile-to-system control communications. FIG. 7 illustrates a typical LED display tile 150 as may be used in the creation of video walls. High level components include the LED pixel array 152 and component housing 154, which includes components such as tile controller 156 and multiple connectors 158. Tile controller 156 includes processing and storage for executing functions such as video packet switching, directing the video signal to appropriate pixels and communications between tiles and through tiles to the system control. Individual tile controllers 156 also control the PWM signal in many tile designs. Tile connectors 158 are typically disposed on each tile edge to facilitate communication with adjacent tiles for relay of tile identification information, control signals and video signals. Connectors may be physical connections or communicate via a variety of wireless protocols as will be understood by persons skilled in the art.

In a typical application a video source is fed into the processor, the processor divides the feed into tile-sized pieces (or in IP-based systems, packetizes the video feed), sends those pieces or packets to the tiles. The tiles in turn emit that data as light as a PWM signal reproducing the video source on the display wall at a brightness set by the PWM signal. The processing and sending of the video data from the controller/processor to the tiles uses CPU capacity and communication channel bandwidth. Adding multiple additional time zone control to the video signal and embedding additional static color signals within specific time slices uses additional CPU capacity and communication channel bandwidth. In some systems, very high resolution video wall systems may already be operating at close to CPU capacity and/or communication channel bandwidth, and thus unable to take advantage of synchronization and strobe smoothing techniques disclosed herein if the time zones and/or static color control signals are embedded with the video signal. In order to reduce demand on the CPU or communications channel, instead of embedding these control signals with the video signal, time zones with on/off instructions and/or timing for static color displays (such as during time periods A1 and C2 in FIG. 2 as described above) are sent to the tiles ahead of time with instructions stored in a tile memory to cause the tile controller to turn PWM on and off and/or display the required color at the specified time. By sequencing the control signals in this manner and utilizing the existing tile memory and processing capabilities, CPU capacity and/or communication channel bandwidth can be freed up to allow for, inter alia, more video to more tiles or higher resolution video, thus improving operation of the controller, communications and overall system performance.

As a practical example of the foregoing, in order to provide four sub-frames for a 60 fps system, the video can be delivered at 240 fps. However, this high frame rate reduces the overall system processing capacity by 4×, requiring much more sophisticated equipment upstream to send faster data, and therefore may not allow for precise fine tuning of the shutter timing synchronization as described herein. Generating the sub-frame timing zones and static fill colors in the endpoint, i.e. in the tile controllers, based on pre-delivered instructions, may make shutter synchronization control possible in that system where it otherwise might not be. Adding a chromakey color, for example, or an inverse of a video field, can be done calculated in advance and does not require a video payload to deliver such information.

Figure 8:
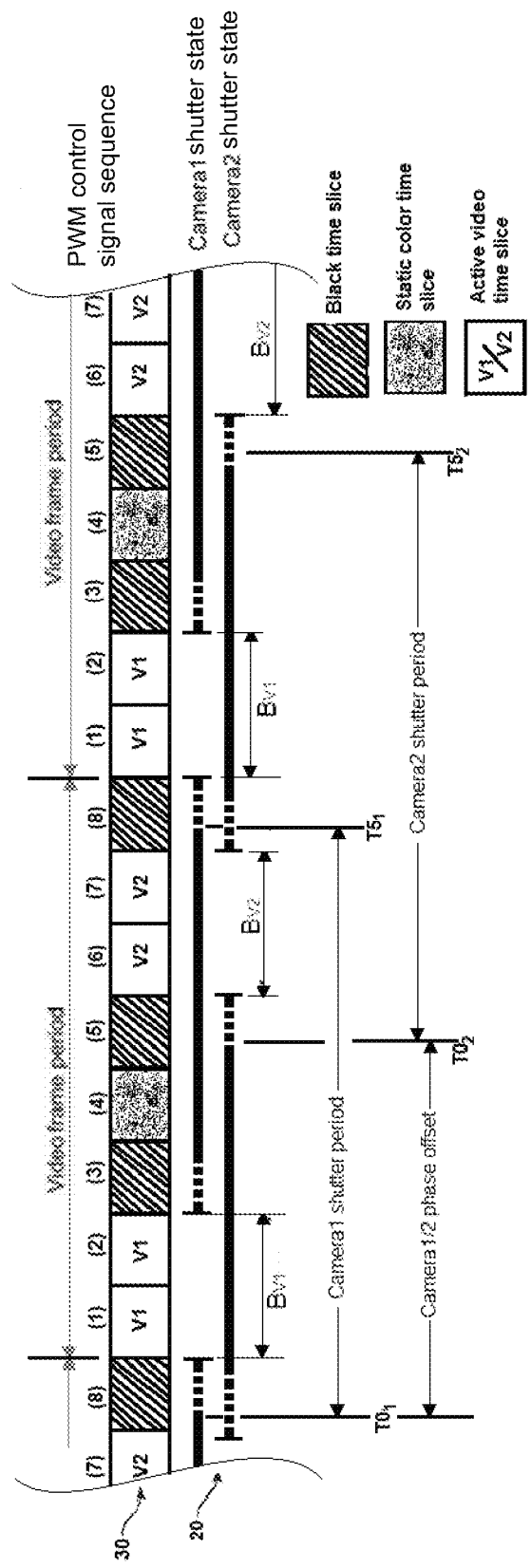
FIG. 8 is a timing diagram illustrating synchronization of multiple cameras with a PWM control signal as in another embodiment of the present disclosure.

FIG. 8 illustrates a further alternative embodiment in which multiple cameras are employed, capturing at different phase offsets, thus exposed at different portions of the video frame period and capturing different video time control slices to allow for a greater variety of video effects. In the illustrated example, the video frame period is controlled with eight (8) time control slices and two cameras are used. Camera 1 and Camera 2 are configured with the same shutter frequency, but at a phase offset. Using the control sequence as shown in FIG. 8, the LED PWM signal (30) "on" time can be aligned with each camera independently if enough sub-frame time control slices are used. As shown therein, time control slices (1) and (2) are active video slices corresponding to Camera1 open shutter window ($B_{v1}$) and time control slices (6) and (7) are active video slices corresponding to Camera 2 open shutter window ($B_{v2}$). According to the principles described herein above, time control slices (3), (5) and (8), which align with camera sensor partial charge states, are set to display black to avoid creation of artifacts in the captured video streams, and time control slice (4), which falls in a shutter closed time for both cameras, displays a static color as desired to reduce strobing effects for live viewers. The timing for two cameras illustrated in FIG. 8 is merely illustrative of a multi-camera embodiment. Any number of cameras may be used based on the teachings presented herein, generally limited only by the capabilities of the equipment. Multi-camera embodiments provide an improvement over existing systems by allowing display of different background video content within specific time frames to permit the different cameras to capture different backgrounds while still focused on the same foreground action.

Figure 9:
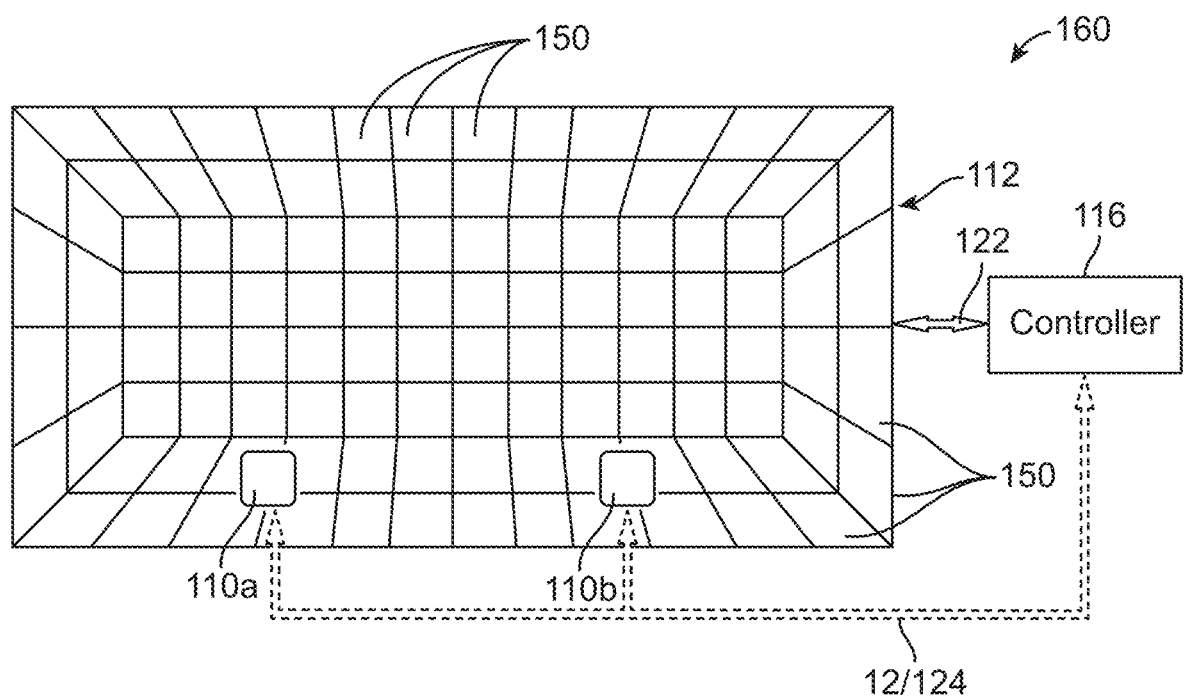
FIG. 9 is a schematic depiction of another alternative embodiment with a three-dimensional light-emitting display volume and two image capture devices according to the present disclosure.

FIG. 9 illustrates a further alternative system 160 employing a light-emitting three-dimensional volume as display 112, with two image capture devices 110a and 110b, the timing for which is described above in connection with FIG. 8. In this embodiment, the light-emitting three-dimensional volume is comprised of arrays of light-emitting tiles 150 as shown in FIG. 7. Controller 116 and communication links 120, 122, and 124 may be configured by persons skilled in the art based on the teachings of the present disclosure and as elsewhere described herein. System 160 allows a live action scene to be captured within the three-dimensional volume, surrounded video supplied virtual environment, all of which is simultaneously captured by image capture devices 110a and 110b.

As may be appreciated by persons skilled in the art, certain control configurations according to the present disclosure may result in relatively shorter capture periods meaning that less light is received by the camera sensor than otherwise may be the case. A number of options may be employed for adjusting brightness of the captured image in this situation, such as increasing the PWM on time (higher duty cycle) making the display brighter, adjusting the camera's aperture to let in more of the light, removing any ND (Neutral Density) filters that the camera may have been using, adjusting the shutter angle (within PWM limits), and increasing the camera's sensor sensitivity (ISO). In specific situations with specific equipment, other options for brightness control may be presented to achieve any desired image capture quality or artistic effects.

Figure 10:
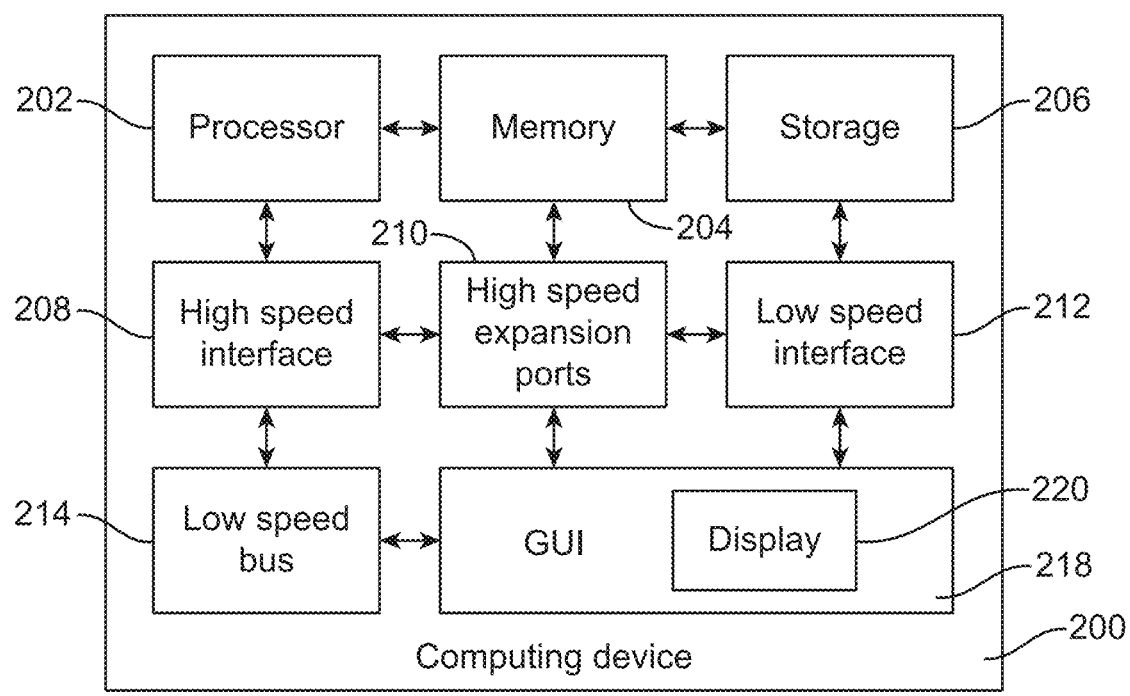
FIG. 10 is a block diagram showing an example of a system, camera or display controller according to the present disclosure.

In some embodiments, control functions, such as camera control 114, display control 118 or tile control 156, may be executed as one or more computing devices 200 as illustrated in FIG. 10. In this example, computing device 200 includes one or more processors 202, memory 204, storage device 206, high speed interface 208 connecting to memory 204 and high speed expansion ports 210, and a low speed interface 212 connecting to low speed bus 214 and storage device 206. Each of the components 202, 204, 206, 208, 210, and 212, are interconnected using various busses or other suitable connections as indicated in FIG. 10 by arrows connecting components. The processor 202 can process instructions for execution within the computing device 200, including instructions stored in the memory 204 or on the storage device 206 to display graphical information via GUI 218 with display 220, or on an external user interface device, coupled to high speed interface 208. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Memory 204 stores information within the computing device 200. In one implementation, the memory 204 is a computer-readable medium. In one implementation, the memory 204 is a volatile memory unit or units. In another implementation, the memory 204 is a non-volatile memory unit or units.

Storage device 206 is capable of providing mass storage for computing device 200, and may contain information such as timing control, time slice size and/or static color chroma and timing as described hereinabove. In one implementation, storage device 206 is a computer-readable medium. In various different implementations, storage device 206 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 204, the storage device 206, or memory on processor 202.

High speed interface 208 manages bandwidth-intensive operations for computing device 200, while low speed controller 212 manages lower bandwidth-intensive operations. Such allocation of duties is exemplary only. In one implementation, high speed interface 208 is coupled to memory 204, display 220 (e.g., through a graphics processor or accelerator), and to high-speed expansion ports 210, which may accept various expansion cards (not shown). In the implementation, low speed controller 212 is coupled to storage device 206 and low speed expansion port 214. The low speed expansion port, which may include various communication ports (e.g., USB, Bluetooth, Ethernet, wireless Ethernet) may be coupled to one or more input/output devices as part of GUI 218 or as a further external user interface, such as a keyboard, a pointing device, a scanner, or a networking device such as a switch or router, e.g., through a network adapter.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of wired or wireless digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The following paragraphs describe additional alternative embodiments of inventions disclosed herein:

A method of image capture of a scene including at least one display driven by a PWM control signal, comprising: initiating image capture with an image capture device at an initial time with the PWM control signal set to off at the initial time; setting the PWM control signal to on after a first partial shutter period of the image capture device; maintaining the PWM control signal at on during an open shutter period of the image capture device; setting the PWM control signal to off at or before a second partial shutter period of the image capture device; and repeating each said setting and maintaining of the PWM control signal through a series of image capture frames.

The method described in the preceding paragraph, further comprising maintaining the PWM control signal off during a closed shutter period of the image capture device during each of the captured frames.

The method described in second preceding paragraph, further comprising setting the PWM control signal on during all or part of a closed shutter period of the image capture device during each of the captured frames.

The method described in any of the three preceding paragraphs, wherein said setting the PWM control signal to on after a partial shutter period comprises: setting the PWM control signal to on at an initial sync delay time after the initial time; identifying presence or absence of leading edge artifacts in the captured image; and when leading edge artifacts are present, increasing the sync delay time until leading edge artifacts are reduced or eliminated in the captured image.

The method described in preceding paragraph, wherein said setting of the PWM control signal to on after a partial shutter period further comprises, when leading edge artifacts are absent, decreasing the sync delay time until leading edge artifacts appear in the captured image and, subsequently, increasing the sync delay time to a value greater than the sync delay time at which artifacts appeared in the captured image.

The method described in second preceding paragraph, wherein said setting the PWM control signal to off at or before a second partial shutter period comprises: setting the PWM control signal to off after an initial sync on time following the sync delay time; identifying presence or absence of trailing edge artifacts in the captured image; and when trailing edge artifacts are present, decreasing the sync on time until trailing edge artifacts are reduced or eliminated in the captured image.

The method described in the preceding paragraph, wherein said setting the PWM control signal to off at or before a second partial shutter period further comprises when trailing edge artifacts are absent, increasing the sync on time until trailing edge artifacts appear in the captured image and, subsequently, decreasing the sync on time to a value less than the sync on time at which artifacts appeared in the captured image.

The method described in any of the seven preceding paragraphs, wherein said steps of setting and maintaining comprise: displaying on the at least one display a first static color during an initial sync delay time beginning at the initial time; displaying on the at least one display a second static color during an initial sync on time beginning after the initial sync delay time; displaying on the at least one display a third static color after the initial sync on time; adjusting the initial sync delay time and the initial sync on time until the first and third static colors do not appear in the captured image of the at least one display; selecting as the sync delay time the initial sync delay time at which the first static color does not appear in the captured image; selecting as the sync on time the initial sync on time at which the third static color does not appear in the captured image; setting the PWM control signal to on after the sync delay time; setting the PWM control signal to off after the sync on time; maintaining the PWM control signal at on during the sync on time; and changing the second static color during the sync on time to a desired video feed.

The method described in any of the eight preceding paragraphs, further comprising: initiating image capture with a second image capture device at a second initial time, wherein the second initial time begins after the second partial shutter time of the first image capture device; setting the PWM control signal to on after a first partial shutter period of the second image capture device; maintaining the PWM control signal at on during an open shutter period of the second image capture device; setting the PWM control signal to off at or before a second partial shutter period of the second image capture device.

The method described in the preceding paragraph, further comprising aligning the first partial shutter period of the first image capture device with the second partial shutter period of the second image capture device.

The method described in the preceding paragraph, wherein the first and second image capture devices have first and second total shutter periods, respectively, and said method further comprises maintaining a constant phase offset between the first and second total shutter periods.

The method described in the preceding paragraph, wherein the first image capture device is in a closed shutter period during the second image capture device open shutter period.

The method described in the preceding paragraph, further comprising: aligning a closed shutter period of the first image capture device with a closed shutter period of the second image capture device; and setting the PWM control signal to on during the aligned closed shutter periods.

The method described in any of the preceding thirteen paragraphs, further comprising: dividing each image capture frame into a plurality of time slices; setting the PWM control signal to off during time slices aligned in whole or in part with the partial shutter periods; and setting the PWM control signal to on during time slices aligned in whole or in part with the open shutter periods.

The method described in the preceding paragraph, wherein the time slices are equal in time length and there is a whole number of time slices in each image capture frame.

A method of image capture of a scene including at least one display driven by a PWM control signal using at least one image capture device wherein the image capture device captures images in frames with each frame including at least one partial shutter period, an open shutter period and a closed shutter period, the method comprising: dividing each frame into a plurality of time slices; setting the PWM control signal to off during time slices aligned in whole or in part with the partial shutter periods; setting the PWM control signal to on during time slices aligned in whole or in part with the open shutter periods; initiating image capture with said PWM control signal settings; and maintaining said PWM control settings through a series of image capture frames.

The method described in the preceding paragraph, wherein the time slices are equal in time length and there is a whole number of time slices in each image capture frame.

The method described in either of the two preceding paragraphs, further comprising setting the PWM control signal to on during time slices aligned with the closed shutter periods.

The method described in either of the second or third preceding paragraphs, wherein the PWM control signal is set to on only during time slices aligned in whole with open shutter periods or only during time slices aligned in whole with open and closed shutter periods.

A method of image capture of a scene including at least one display using at least one image capture device, comprising: displaying on the at least one display a first static color during a sync delay time beginning at an initial time; displaying on the at least one display a second static color during a sync on time beginning after the sync delay time; displaying on the at least one display a third static color after the sync on time; capturing an image of the at least one display device with the image capture device; adjusting the sync delay time and the sync on time until the first and third static colors do not appear in the captured image of the at least one display; changing the second static color of a desired video feed; and capturing the scene including the at least one display displaying the desired video feed.

The method described in the preceding paragraph, wherein the at least one display comprises a display driven by a PWM control signal and wherein the image capture device captures images in frames with each frame including at least one partial shutter period, an open shutter period and a closed shutter period.

An image capture system, comprising: an image capture device configured to capture a moving image of a scene, the image capture device comprising a shutter mechanism capturing images in a series of frames, each frame including an open shutter period preceded and followed by partial shutter periods; a system display device that includes a light emitting display surface configured to display images within the scene captured by the image capture device and a driver configured to drive the light emitting display surface with a PWM control signal; and a control device that sets the PWM control signal to off during partial shutter periods of the image capture device and sets the PWM control signal to on during open shutter periods of the image capture device.

The system described in the preceding paragraph, wherein the control device: divides each image capture frame into a plurality of time slices; sets the PWM control signal to off during time slices aligned in whole or in part with the partial shutter periods; and sets the PWM control signal to on during time slices aligned in whole or in part with the open shutter periods.

The system described in either of the two preceding paragraphs, wherein the control device comprises: at least one microprocessor; and a memory in operative communication with the at least one microprocessor, the memory containing machine-executable instructions that, when executed by the at least one microprocessor, set an initial time at initiation of image capture; allow a user to set a sync delay time beginning at the initial time; allow the user to set a sync on time beginning after the sync delay time; turn off the PWM control signal for the sync delay time beginning at the initial time; turn on the PWM control signal for the sync on time after the sync delay time; turn off the PWM control signal after the sync on time; and reset the initial time at the end of each image capture frame.

The system described in the preceding paragraph, wherein the memory contains further machine-executable instructions that, when executed by the at least one microprocessor, display on a user interface display device a graphical user interface (GUI) with at least a first GUI region permitting user entry of sync delay time values and sync on time values.

The system described in either of the two preceding paragraphs, wherein the memory contains further machine-executable instructions that, when executed by the at least one microprocessor, display the GUI with at least a second GUI region displaying the image captured by the image capture device and present within the first GUI region (1) a user selectable option to display on the system display device a video feed or a first static color during a sync delay time, (2) a user selectable option to display on the system display device a video feed or a second static color during a sync on time beginning after the sync delay time, and (3) a user selectable option to display on the system display device a video feed or a third static color after the sync on time; whereby adjustment of the sync delay time and the sync on time until the first and third static colors do not appear in the captured image of the at least one display identifies a sync delay time corresponding to an initial partial shutter period and the shutter open period in each image capture frame of the image capture device.

The system described in any of the three preceding paragraphs, wherein the memory contains further machine-executable instructions that, when executed by the at least one microprocessor, divide each image capture frame into a plurality of time slices; and set the PWM control signal to on or off by time slice.

The system described in the preceding paragraph, wherein each frame of the image capture device further includes a shutter closed period; and the memory further contains machine-executable instructions that, when executed by the at least one microprocessor, allow the user to set the on or off state of the PWM control signal for time slices falling within the closed shutter periods, and allow the user to select a static image or a video feed for display when the PWM state is set to on during the closed shutter periods; and wherein the display device comprises an array of light-emitting tiles, each tile having a tile control configured as the PWM driver for the tile and including at least one tile microprocessor and a tile memory in operative communication with the at least one tile microprocessor, the tile memory containing machine-executable instructions that, when executed by the at least one tile microprocessor display on the tile the static image when selected by the user.

The system described in any of the seven preceding paragraphs, wherein each frame of the image capture device further includes a shutter closed period; and the control device allows a user to set the PWM signal to on or to off during the shutter closed periods.

The system described in any of the preceding eight paragraphs, wherein the system display device comprises a three-dimensional (3D), light-emitting display volume comprising a three-dimensional array of light-emitting tiles joined along tile edges to form a seamless 3D volume display wall, and each said tile includes a unique PWM driver for each said tile; and the image capture device comprises at least one camera with a digital image sensor configured electronically with said shutter mechanism.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A method of image capture of a scene including at least one light emitting video display wherein video output of said display is driven by a video control signal, wherein said image capture comprises a series of image capture frames, the method comprising:
    dividing each image capture frame into a plurality of time slices;
    initiating image capture with an image capture device at an initial time with the video control signal set to off at the initial time;
    setting the video control signal to on after a first partial shutter period of the image capture device;
    setting the video control signal to on during time slices aligned in whole or in part with the open shutter periods;
    setting the video control signal to off at or before a second partial shutter period of the image capture device;
    setting the video control signal to off during time slices aligned in whole or in part with the partial shutter periods; and
    repeating each said setting and maintaining of the video control signal through a series of image capture frames.

2. The method of claim 1, wherein the time slices are equal in time length and there is a whole number of time slices in each image capture frame.

3. The method of claim 1, wherein the light emitting video display is an active-matrix light-emitting diode (AMLED) display with an active-matrix control signal.

4. The method of claim 1, wherein the light emitting video display is a light emitting diode (LED) display with a pulse width modulation (PWM) control signal.

5. The method of claim 1, further comprising maintaining the video control signal off during a closed shutter period of the image capture device during each of the captured frames.

6. The method of claim 1, further comprising setting the video control signal on during all or part of a closed shutter period of the image capture device during each of the captured frames.

7. The method of claim 1, wherein said setting the video control signal to on after a partial shutter period comprises:

setting the video control signal to on at an initial sync delay time after the initial time;
    identifying presence or absence of leading edge artifacts in the captured image; and
    when leading edge artifacts are present, increasing the sync delay time until leading edge artifacts are reduced or eliminated in the captured image.

8. The method of claim 7, wherein said setting of the video control signal to on after a partial shutter period further comprises, when leading edge artifacts are absent, decreasing the sync delay time until leading edge artifacts appear in the captured image and, subsequently, increasing the sync delay time to a value greater than the sync delay time at which artifacts appeared in the captured image.

9. The method of claim 7, wherein said setting the video control signal to off at or before a second partial shutter period comprises:
    setting the video control signal to off after an initial sync on time following the sync delay time;
    identifying presence or absence of trailing edge artifacts in the captured image; and
    when trailing edge artifacts are present, decreasing the sync on time until trailing edge artifacts are reduced or eliminated in the captured image.

10. The method of claim 7, wherein said setting the video control signal to off at or before a second partial shutter period further comprises when trailing edge artifacts are absent, increasing the sync on time until trailing edge artifacts appear in the captured image and, subsequently, decreasing the sync on time to a value less than the sync on time at which artifacts appeared in the captured image.

11. The method of claim 1, wherein said steps of setting and maintaining comprise:
    displaying on the at least one display a first static color during an initial sync delay time beginning at the initial time;
    displaying on the at least one display a second static color during an initial sync on time beginning after the initial sync delay time;
    displaying on the at least one display a third static color after the initial sync on time;
    adjusting the initial sync delay time and the initial sync on time until the first and third static colors do not appear in the captured image of the at least one display;
    selecting as the sync delay time the initial sync delay time at which the first static color does not appear in the captured image;
    selecting as the sync on time the initial sync on time at which the third static color does not appear in the captured image;
    setting the video control signal to on after the sync delay time;
    setting the video control signal to off after the sync on time;
    maintaining the video control signal at on during the sync on time; and
    changing the second static color during the sync on time to a desired video feed.

12. The method of claim 1, further comprising:
    initiating image capture with a second image capture device at a second initial time, wherein the second initial time begins after the second partial shutter time of the first image capture device;
    setting the video control signal to on after a first partial shutter period of the second image capture device;
    maintaining the video control signal at on during an open shutter period of the second image capture device;

setting the video control signal to off at or before a second partial shutter period of the second image capture device.

13. The method of claim 12, further comprising aligning the first partial shutter period of the first image capture device with the second partial shutter period of the second image capture device.

14. The method of claim 13, wherein the first and second image capture devices have first and second total shutter periods, respectively, and said method further comprises maintaining a constant phase offset between the first and second total shutter periods.

15. The method of claim 13, wherein the first image capture device is in a closed shutter period during the second image capture device open shutter period.

16. The method of claim 15, further comprising:
aligning a closed shutter period of the first image capture device with a closed shutter period of the second image capture device; and
setting the video control signal to on during the aligned closed shutter periods.

17. An image capture system, comprising:
an image capture device configured to capture a moving image of a scene, the image capture device comprising a shutter mechanism capturing images in a series of frames, each frame including an open shutter period preceded and followed by partial shutter periods;
a system display device that includes:
a light emitting display surface configured to display images within the scene captured by the image capture device, and
a driver configured to drive the light emitting display surface with a video control signal; and
a control device that:
sets the video control signal to off during partial shutter periods of the image capture device,
sets the video control signal to on during open shutter periods of the image capture device;
divides each image capture frame into a plurality of time slices;
sets the video control signal to off during time slices aligned in whole or in part with the partial shutter periods; and
sets the video control signal to on during time slices aligned in whole or in part with the open shutter periods.

18. The system of claim 17, wherein the light emitting display surface comprises an active-matrix light-emitting diode (AMLED) display with an active-matrix control signal.

19. The system of claim 17, wherein the light emitting display surface comprises a light emitting diode (LED) display with a pulse width modulation (PWM) control signal.

20. The system of claim 17, wherein the control device comprises:
at least one microprocessor; and
a memory in operative communication with the at least one microprocessor, the memory containing machine-executable instructions that, when executed by the at least one microprocessor:
set an initial time at initiation of image capture;
allow a user to set a sync delay time beginning at the initial time;
allow the user to set a sync on time beginning after the sync delay time;
turn off the video control signal for the sync delay time beginning at the initial time;
turn on the video control signal for the sync on time after the sync delay time;
turn off the video control signal after the sync on time; and
reset the initial time at the end of each image capture frame.

21. The system of claim 20, wherein the memory contains further machine-executable instructions that, when executed by the at least one microprocessor:
display on a user interface display device a graphical user interface (GUI) with at least a first GUI region permitting user entry of sync delay time values and sync on time values.

22. The system of claim 21, wherein the memory contains further machine-executable instructions that, when executed by the at least one microprocessor:
display the GUI with at least a second GUI region displaying the image captured by the image capture device;
present within the first GUI region:
a user selectable option to display on the system display device a video feed or a first static color during a sync delay time;
a user selectable option to display on the system display device a video feed or a second static color during a sync on time beginning after the sync delay time; and
a user selectable option to display on the system display device a video feed or a third static color after the sync on time;
whereby adjustment of the sync delay time and the sync on time until the first and third static colors do not appear in the captured image of the at least one display identifies a sync delay time corresponding to an initial partial shutter period and the shutter open period in each image capture frame of the image capture device.

23. The system of claim 20, wherein the memory contains further machine-executable instructions that, when executed by the at least one microprocessor:
divide each image capture frame into a plurality of time slices; and
set the video control signal to on or off by time slice.

24. The system of claim 23, wherein:
each frame of the image capture device further includes a shutter closed period;
the memory further contains machine-executable instructions that, when executed by the at least one microprocessor:
allow the user to set the on or off state of the video control signal for time slices falling within the closed shutter periods, and
allow the user to select a static image or a video feed for display when the video state is set to on during the closed shutter periods; and
the display device comprises an array of light-emitting tiles, each tile having a tile control configured as the video driver for the tile and including at least one tile microprocessor and a tile memory in operative communication with the at least one tile microprocessor, the tile memory containing machine-executable instructions that, when executed by the at least one tile microprocessor display on the tile the static image when selected by the user.

25. The system of claim 17, wherein:
each frame of the image capture device further includes a shutter closed period; and the control device allows a user to set the video signal to on or to off during the shutter closed periods.

26. The system of claim 17, wherein:

the system display device comprises a three-dimensional (3D), light-emitting display volume comprising a three-dimensional array of light-emitting tiles joined along tile edges to form a seamless 3D volume display wall, and each said tile includes a unique video driver for each said tile; and the image capture device comprises at least one camera with a digital image sensor configured electronically with said shutter mechanism.

\* \* \* \* \*